United States Patent [19]

Cornell et al.

[11] Patent Number: 4,663,714

[45] Date of Patent: May 5, 1987

[54] SYNCHRONIZED MID-MOUNTED CLUTCH FOR VARIABLE POWER TRAIN

[75] Inventors: Charles R. Cornell; David J. Olson, both of Naperville, Ill.

[73] Assignee: J. I. Case Company, Racine, Wis.

[21] Appl. No.: 662,220

[22] Filed: Oct. 18, 1984

[51] Int. Cl.$^4$ .................. B60K 41/28; G06F 15/20
[52] U.S. Cl. ...................... 364/424.1; 74/687; 192/3.58; 192/0.076
[58] Field of Search ............ 364/424.1; 74/687, 718, 74/720, 732; 192/3.51–3.58, 0.052, 0.076, 103 R; 361/242, 243

[56] References Cited

U.S. PATENT DOCUMENTS

| | | | |
|---|---|---|---|
| 3,455,184 | 7/1969 | Frandsen et al. | 74/687 |
| 3,733,931 | 5/1973 | Nyman et al. | 74/687 |
| 3,914,938 | 10/1975 | Cornell et al. | |
| 3,952,829 | 4/1976 | Gray | |
| 3,969,958 | 7/1976 | Miyao et al. | 74/687 |
| 4,091,617 | 5/1978 | Cornell | |
| 4,112,479 | 9/1978 | White | 361/243 |
| 4,158,290 | 6/1979 | Cornell | |
| 4,180,979 | 1/1980 | Cornell | |
| 4,514,811 | 4/1985 | Daubenmier et al. | 192/0.076 |
| 4,548,303 | 10/1985 | Beemer et al. | 192/3.58 |

OTHER PUBLICATIONS

"Hydrostatic Transmissions Controls-Is there Space for Optimization?", Zarotti et al., S.A.E., paper 780465, Apr. 1978.

"Earth Movers Dig into Computers", *Truck & Off-Highway Industries*, Jan./Feb., 1983, pp. 33–35.

*Primary Examiner*—Parshotam S. Lall
*Attorney, Agent, or Firm*—Cullen, Sloman, Cantor, Grauer, Scott & Rutherford

[57] ABSTRACT

A microprocessor controlled drive train having an engine-connected variable ratio speed transmission and a load-connected range gear transmission connected by a mid-mounted clutch disposed therebetween has an automatic clutch control mode of operation, with the clutch disengaged and the range transmission in gear to complete a shift, wherein the speeds of the clutch sides are synchronized before engagement by appropriately varying the ratio of the speed transmission, thereby eliminating shift shock. This automatic clutch control mode is preferably employed in combination with operating modes which control both the speed transmission ratio and engine throttle to maintain fuel efficient operation.

1 Claim, 9 Drawing Figures

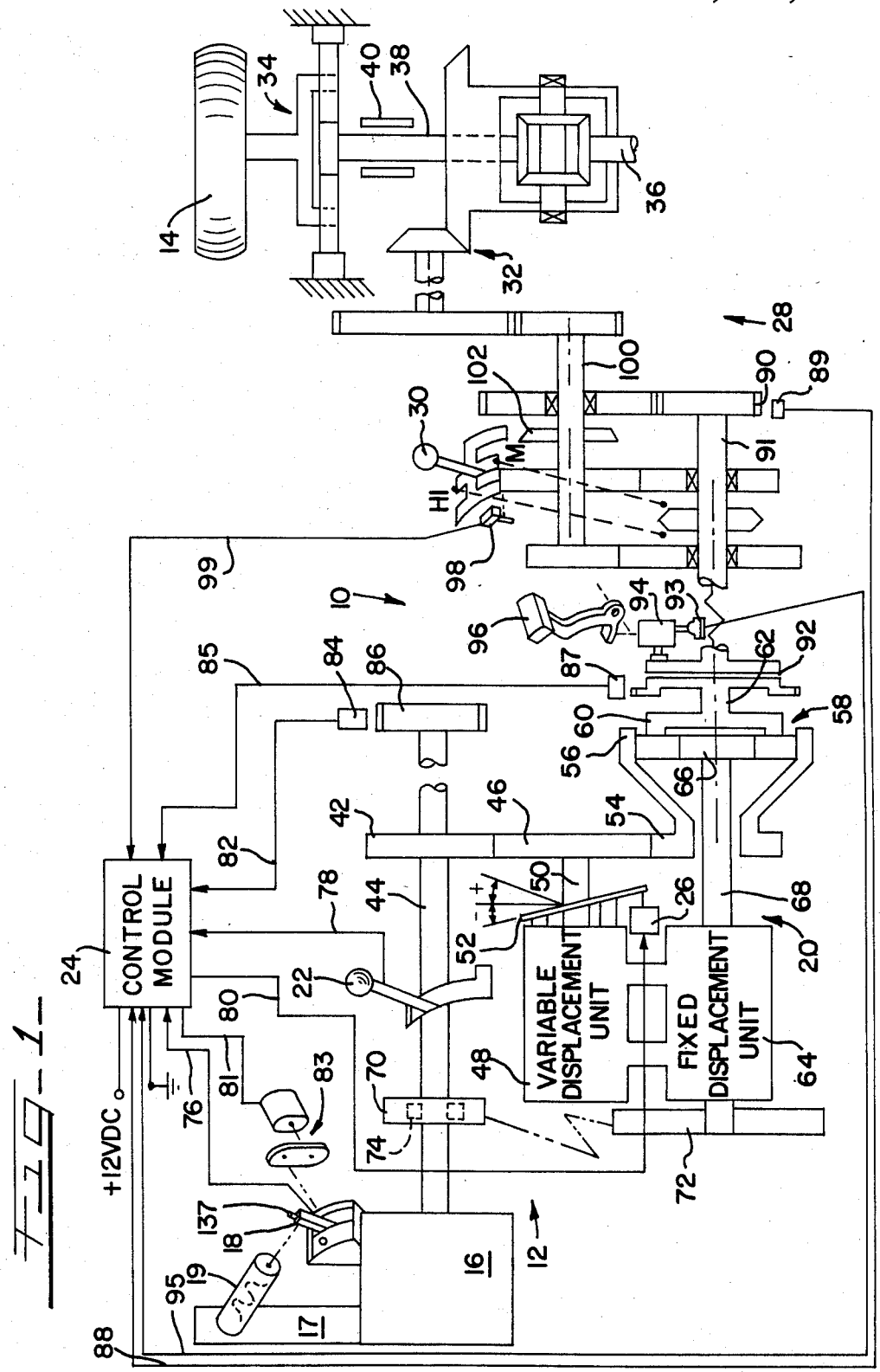

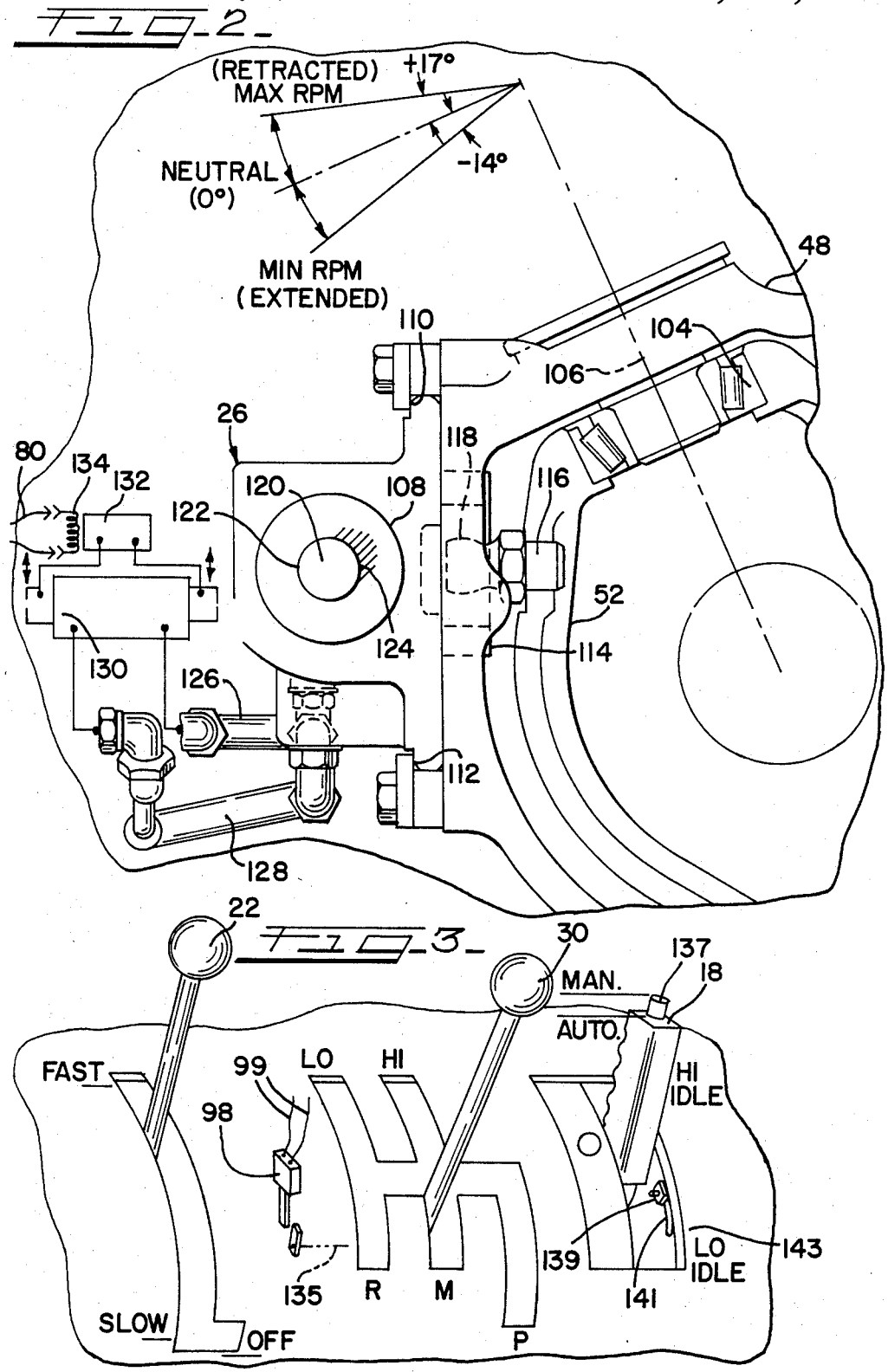

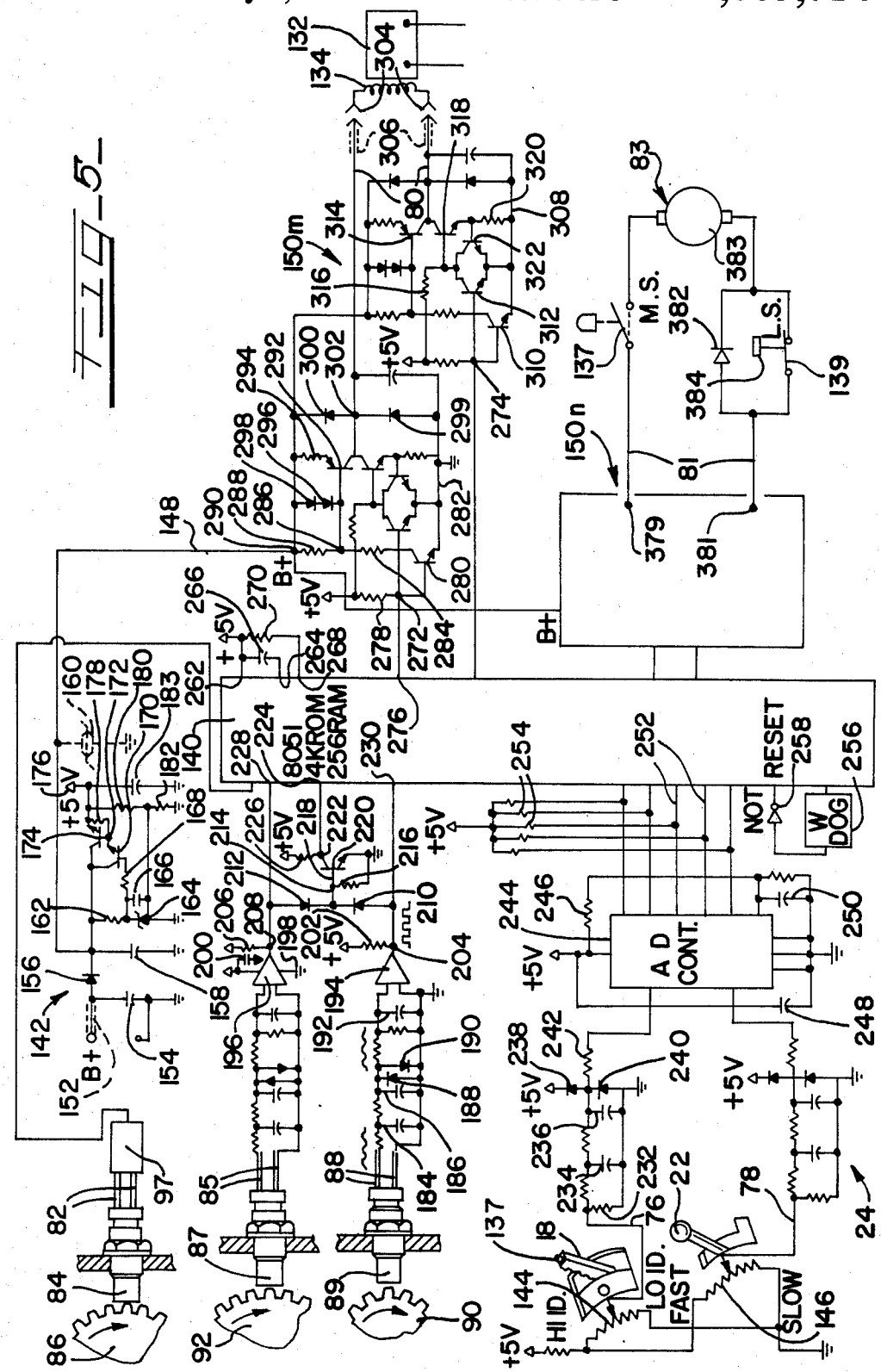

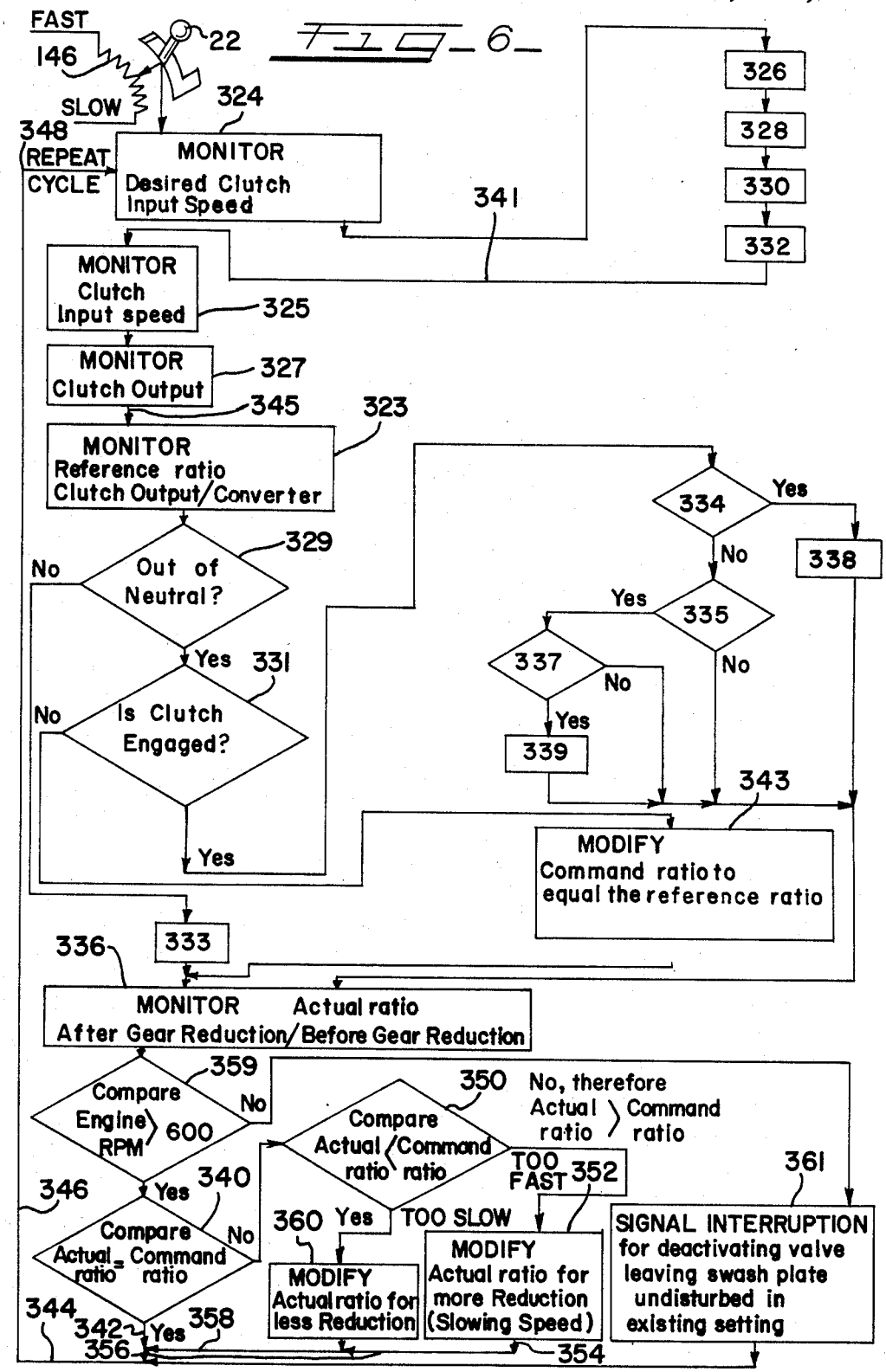
FIG_6

SYNCHRONIZED MID-MOUNTED CLUTCH FOR VARIABLE POWER TRAIN

CROSS REFERENCE TO RELATED CASES

This application is a companion case to respectively coassigned U.S. Pat. No. 4,138,907 and U.S. Pat. No. 4,388,987, the tractor power train disclosures of both of which are incorporated in their entirety herein by reference.

Also, this application is related to coassigned U.S. patent application Cornell Ser. No. 512,832 filed July 11, 1983, now U.S. Pat. No. 4,594,666 relating to a power train automatic transmission control, and is a continuation-in-part of coassigned U.S. patent application Ser. No. 582,192 filed Feb. 21, 1984, relating to a power train automatic power setting control, and of coassigned U.S. patent application Ser. No. 620,762 filed June 14, 1984, relating to a power train automatic power lever control. The present application is directed to the same automatic control machinery as disclosed in these applications but, in concentrating on the aspect that a clutch-driving tractor power train is involved, this application shifts emphasis to that particular control machinery making it especially adapted, by microprocessor, as an automatic clutch control for the tractors.

BACKGROUND OF THE INVENTION

This engine and power train invention is energy related, having a conserving effect by delivering prime power at minimum brake specific fuel consumption (BSFC). More particularly, it relates to a transmission monitor/control microprocessor effective automatically to adjust the ratio of a clutch-driving power train of the type in which such transmission, in the power limiting mode is so continuously varied by the computer that engine power is applied at all levels with minimum fuel consumption and in which, during shifting and while the clutch is disengaged, the transmission varies relative rotation in the clutch in a way automatically to minimize the speed differential at its opposite sides.

In regard to its latter, clutch control phase, the invention, in its more specific aspects, is to be viewed as relating to a clutch-driving variable ratio power train, in which the clutch is a mid-mounted one, in turn driving a load connected range-shift gear transmission on the clutch output side. Suitable applications include agricultural and nonagricultural vehicles and machinery, but especially an agricultural tractor.

As background thereto, the material information includes but is not limited to U.S. Pat. Nos. 3,952,828, 4,180,979, 4,091,617, 4,158,290, and especially the (U.S.) Society of Automotive Engineers Paper No. 780465 relating to BSFC and also U.S. Pat. No. 3,914,938.

SUMMARY OF THE INVENTION

In practice, shock is known to attend the engagement of a friction clutch, especially of an inter-gearing one such as a mid-mounted clutch, burdened by having high speed rotational inertia which must be overcome at both of its sides in order for them frictionally to bring about the rotational synchronizing sought.

It is therefore an object of my invention, to provide microprocessor monitoring and control of the power train, to automatically pre-synchronize the clutch, or nearly so, and thus always control reengagement resulting in light attendant shock, if any.

Another object, in a power train environment as composed herein of an engine-connected continuously variable transmission (CVT) mid-coupled to a loaded second transmission by a mid-mounted clutch, is to activate the CVT into its clutch pre-synchronizing operation only when the clutch is disengaged.

A further object, in line with the preceding objective, and wherein the loaded second transmission is a range transmission shifted through and then out-of-neutral so as to change ranges, is the provision therein of an out-of-neutral switch for automatically delaying the resulting automatic pre-synchronization, until the range transmission passes out of neutral to complete the shift.

An additional object resides in utilizing a monitor/control processor for a shiftable power train effective, in a power limiting operating phase occurring following a range shift and reengaging, to deliver power under optimum fuel conservation rates of flow throughout the power range and effective, in the alternate phase during the shift, to pre-synchronize the clutch prior to its reengagement.

Yet another object resides in utilizing microprocessor control over a shiftable, engine-powered train effective, in a speed logic operating phase occurring following a range shift and reengagement to maintain constant ground speed as desirable under all light engine loads and effective, in the alternate phase during the shift, to pre-synchronize the clutch prior to its reengagement.

Yet a further object resides in utilizing microprocessor control over a shiftable, engine-powered train effective, in an automatic power level operating phase occurring following a range shift and reengagement, to vary the power setting of the engine automatically for an optimum power match with load throughout the range of power settings and effective, in the alternate phase during the shift, to pre-synchronize the clutch prior its reengagement.

Yet an additional object resides in the provision, in general, of an operating method for a ground-supported vehicle's engine-power train, having a mid-mounted clutch disposed between an engine-powered speed transmission connected to the clutch input side and a range transmission connected to the clutch output side, wherein the reduction ratio of the speed transmission is controlled in accordance with microprocessor programmed means in a power limiting operating phase to maintain the engine speed at a desired level providing near-minimum brake specific fuel consumption point, in a speed logic operating phase to limit the vehicle's ground speed and in an automatic clutch control phase with the clutch disengaged to bring the clutch at its opposite sides into substantial synchronism.

Although the invention is primarily contemplated for tractor use and presently shown applied specifically to a mid-mounted friction clutch arranged with input and output sides, and with an engine-connected continuously variable transmission in driving engagement with the clutch at its input side, and with the output side in driving engagement with a load-connected range-shift transmission, the principles hereof have equal application to other types of clutches, transmission, and power trains, where the problems attendant when operation of the clutch brings the two sides into engagement can be alleviated by first synchronizing the clutch at both sides.

DESCRIPTION OF THE DRAWINGS

Further features, objects, and advantages will either be specifically pointed out or become apparent when, for a better understanding of the invention, reference is made to the following description, taken in conjunction with the accompanying drawings which show a preferred embodiment thereof and in which:

FIG. 1 is a schematic representation of a tractor power train as taken essentially in top plan view and embodying a mid-mounted clutch, its synchronizing control and other controls in accordance with the invention;

FIG. 2 is a partial, transverse-sectional view, partially schematic, showing the electrical hydraulic, variable displacement mechanism for changing the speed reduction ratio of the power train;

FIG. 3 is an isometric view showing the power train controls including the automatic power lever provided for the tractor operator;

FIG. 5 schematically includes the control of FIG. 1, and further includes the operator's controls of FIG. 3 and part of the schematic portion of FIG. 2, all in an overall schematic control diagram;

FIG. 6 is a block diagram sequencing those operating steps which the automatic transmission control is programmed to follow;

A PREFERRED EMBODIMENT

Figure 4B:
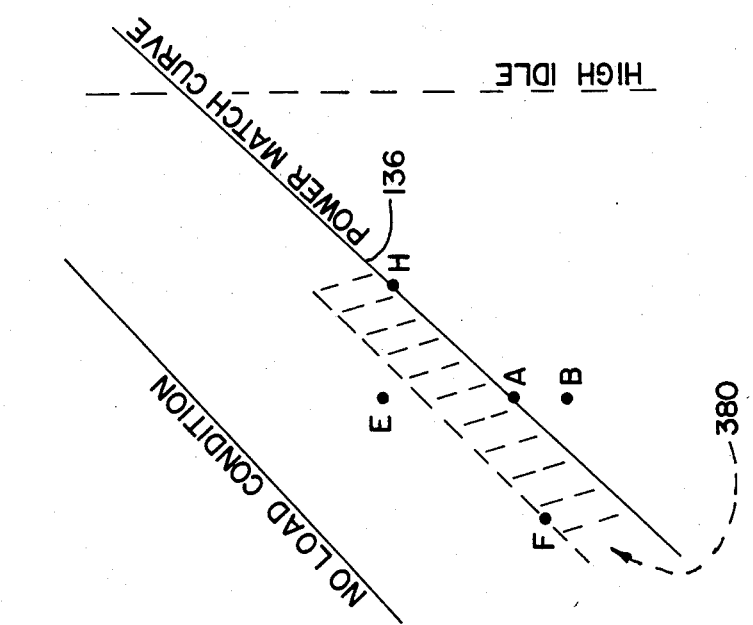
FIG. 4A is an actual speed-desired speed graph with the power match curve plotted thereon, and complementary FIG. 4B corresponds as an inset of the same graph, to enlarged scale to show additional, modifying data.

More particularly, as shown in FIG. 1, the power train 10 of a farm tractor 12 supplies power for rimpull torque at the tractor drive whees, of which the right rear wheel 14 is representative, through a path including an engine 16 controlled by a fuel injection pump 17 having a mechanical speed governor 19 of the well-known type manufactured by Robert Bosch Company under the designation "RSV" including a spring tensioned speed setting mechanism controlled through a linkage by a power lever 18 to change the governed speed setting by an appropriate change of spring tension. It will be appreciated that, in place of the mechanically controlled injection pump 17, an electronically controlled injection pump might be utilized wherein the fuel output of the injection pump, and thus the engine speed is varied in response to the signal 81 described hereinafter which in the preferred embodiment controls the automatic power lever 18.

There is further provided a hydromechanical speed transmission 20 controlled indirectly with a speed lever 22 and an electrical hydraulic actuator 26 by way of a control module 24. A three-speed, reversible range transmission 28 controlled by a gear shift lever 30, a reduction gear and differential drive 32, a planetary final drive 34 for each drive wheel, and rear drive axles identified at 36 at one side and at 38 at one side connected between the differential 32 and final drive at that side and controlled by a steering brake 40 complete the power train.

In the hydromechanical speed transmission 20, a drive gear 42 on the engine powered, transmission input shaft 44 continually meshes with a countershaft gear 46 which drives a swash-plate-controlled variable, axial piston hydrostatic pump 48 through an interconnecting countershaft 50. The actuator 26 tilts and holds a pump swash plate 52 so as to destroke it to zero pump displacement, and moves it therefrom through positive and negative angles for flow reversal by the pump at varying displacements.

The countershaft gear 46 also continuously meshes with a gear 54 connected to the ring gear 56 of a three element planetary gearset 58 not only providing one of two inputs but also providing two different drive modes, regenerative and split. A planetary carrier 60 serves as the element driving the planetary output shaft 62.

A reversible fixed displacement axial piston motor 64 is mechanically connected to a planetary sun gear 66 by a sun gear shaft 68, and is hydraulically connected to the variable displacement pump 48 so as to be driven by the latter at varying speeds in opposite directions. But despite the sun gear 66 being rotatable in opposite directions, nevertheless the planetary ring gear 56, carrier 60, and planetary output shaft 62 always partake of rotation in the same direction as the transmission input shaft 44. With the swash plate angle full negative and a reverse moving sun gear 66, the effective hydromechanical gear reduction ratio provided at 58 is 1:2.39, and with the swash plate angle full positive and forward sun rotation (i.e., in engine direction), the gear reduction ratio effectively obtainable is 1:1.005.

A pinion 70 supported for rotation on and relative to the transmission input shaft 44 constantly meshes with a gear 72 secured to the same sun gear shaft 68 as the motor 64. The fixed ratio constraint thus imposed on pinion 70 causes it normally to rotate oppositely to the shaft 44, or to rotate in the same direction therewith but normally at a slower speed. Extremely strenuous transmission start up conditions and others can cause the pinion 70 to reach the same speed in the same direction as shaft 44, causing engagement of a one-way overspeed clutch 74 interposed between the pinion and shaft 44 so as to cause the pinion 70 to be a reaction member to sun 66 and motor 64; in that way, strenuous conditions can never make the motor 64 overspeed beyond the geared limits established by the reaction member, i.e., the pinion 70, and so the motor 64 cannot be damaged internally by excessive speed. For further details, reference can be made to the aforementioned U.S. Pat. No. 4,138,907.

A power lead 76 from the automatic power lever 18 enables the module 24 to monitor the power setting, and a speed lead 78 from the speed control lever 22 enables the module to monitor the transmission speed setting. The module 24 is powered by +12V DC as illustrated and, by an ouput cable 80, automatically controls the electrical hydraulic actuator 26 for the swash plate.

By another interconnecting power output cable 81, the module 24 automatically controls a DC motor 83 which is shaft connected, at the pivot of the power lever 18, to rotate the latter into desired spring tension setting positions for the governor mechanism 19, thus resetting injection pump 17 and controlling the engine speed and the available engine power.

An engine speed lead afforded by a connection 82 from a transducer 84 enables the control module 24 to monitor, via one gear 86 indicated on the engine powered, transmission input shaft 44, the actual engine rpm at the input to the hydromechanical speed transmission 20, i.e., before gear reduction.

The control module 24 further provides automatic control of the clutch. It is of course known to engage an interposed clutch so as to synchronize a vehicle power train by bringing it and its load to the same speed, but at times the rotational inertia of the drive machinery can in reengagement make the driven vehicle noticeably lunge or be sharply retarded, with the same abrupt consequences familiar in driver education classes.

It is another thing, however, to cause the power train to synchronize itself along with a clutch interposed therein by bringing the opposite engaging sides or friction faces of the clutch to the same speed for engagement. The present invention results in pre-synchronizing a midmounted clutch so that the speeds match as the sides of the clutch engage, through a uniquely actuated means of speed matching in the clutch, changing its opposite engaging sides from their familiar heavy duty role of synchronizing a power train to the unexpected role of being synchronized by the power train.

Illustrative of one such uniquely actuated means of speed matching is the module 24 in conjunction with an output cable 80 therefrom to the electrical hydraulic actuator 26 for the swash plate. For the necessary input, a transducer 87 which is provided and its transmission speed connection 85 therefrom enable the module 24 to monitor the input side of a mid-mounted master clutch 92 for the transmission output speed, i.e., after gear reduction.

A similar transducer 89 and speed connection 88 enable the module 24 to monitor the output side speed of clutch 92 by means of a clutch-connected pinion 9 and a range transmission shaft 91 leading therefrom directly to the clutch output side. The range transmission shift linkage has, associated therewith by a feeler on the pivot shaft of shift lever 30, an out-of-neutral microswitch 98 which by a connection 99 to the module 24 enables the latter to constantly monitor the power transmitting status of the range transmission 28.

Mid-mounted clutch 92, the master clutch, has an out-of-engagement switch 93 which is closed thereby to indicate declutching and which has a connection 95 to the module 24 for being monitored thereby. Briefly, the module 24 through its transducers compares the clutch input speed for its differential with the clutch output speed and, when actuated by the clutch and transmission switches 93 and 98 precisely and in coordination, operates to electrohydraulically adjust the swash plate actuating means 26 to adjust the transmission ratio and reduce if not eliminate the input-output clutch speed differential immediately prior to reengagement.

A valve controlled hydraulic actuator 94 causes internal multiple plates of the pressure-disengaged clutch 92 to disengage and to engage, respectively, under control of a tractor clutch pedal 96 when it correspondingly is depressed and released. Hydraulically connected to the actuator 94 is the normally open pressure switch 93 which, in response to an hydraulic pressure rise sufficient to disengage the clutch, closes its contacts. In other words, the driver closes the switch 93 by depressing the clutch pedal, and the closed circuit via lead 95 signals the control module 24 that the clutch is decoupled.

The clutch 92 decouples to allow gearshifts in the range transmission 28 and can then recouple together the respective transmissions 20 and 28.

The range transmission 28 has respective sets of speed changing gears mounted on the input and output shafts 91 and 100, respectively. The output side of clutch 92 delivers straight drive to the power driven shaft 91 and the shaft 100 of the range transmission in turn delivers its output to the reduction gear and differential drive 32 and the final drive 34. When the lever 30 is shifted into the position marked HI, a synchronized jaw clutch sleeve shifts on shaft 91 for establishing high range, and a shift of the lever 30 into the position marked M causes an opposite synchronized jaw clutch shift on shaft 91 for mid-range setting in the transmission. The sleeve 102 of a LO synchronized jaw clutch on output shaft 100 is employed for low range and additional means are provided for reverse, not shown, for the range transmission 28.

Gear ratios are selected such that the range transmission 28 provides substantial overlap in its mid range M, so that the infinitely variable speeds otherwise available in the top of the LO range can be readily duplicated, while in the bottom of the mid range M. Similarly, the bottom of the HI range can be duplicated with infinite variability in the top of the mid range M.

In accordance with the principles of the reaction member control in hydromechanical transmissions, the effective gear reduction ratio of speed transmission 20 is established by control of the sun gear 66 in its speed and relative direction of rotation, under the accurate direction of the pump swash plate 52 according to its angle of tilt. Carefully controlled actuator means 26 is provided for the purpose.

ELECTRICAL HYDRAULIC ACTUATOR—FIG. 2

The swash plate 52 is mounted transversely within the case of the pump 48 so as to be centered in a span of bearings, a representative one of which is the tapered bearing 104 defining the plate tilt axis 106. The actuating means 26 comprises a double acting hydraulic cylinder 108 arranged with its housing guided in fixed motor slideways 110 and 112 and having a lug 114 projecting through a window, not shown, cast as a long longitudinal slot in the side of the pump casing. A stud 116 held in screw threads in the swash plate 52 has a ball end 118 projecting laterally into, and closely confined within, a complementary slot in the lug 114. Accordingly, as the cylinder housing moves longitudinally along the side of the pump case as guided along a piston shaft axis 120 for the cylinder, the pump swash plate 52 changes its tilt and then stops within the angular swing range indicated about its tilt axis 106.

In one physically constructed embodiment of the invention, the piston shaft 122 defining the axis 120 of the double acting cylinder 108 projected through seals at opposite ends of the cylinder 108 and was fixed at anchor 124 at the proximal end as viewed in FIG. 2. Connections were such that as the distal hydraulic service line 126 was pressurized so as to introduce fluid to the far side of the fixed piston, not shown, the housing of the cylinder 108 within slideways 110,112 retracted therein relative to proximal anchor 124 so as to tilt the swash plate for positive angularity and higher speed with less gear reduction. Conversely, pressurization of the proximal service line 128 caused advance of the housing of cylinder 108 back toward the anchor to produce negative plate angularity and more gear reduction in the speed transmission, not shown.

A four-way, closed center piloted valve 130 hydraulically controls the cylinder 108, in response to an electrohydraulic proportional servo pilot valve 132 commercially available. The microprocessor output cable 80 through a proportional coil 134 automatically electrically controls the pilot valve 132, the pressure output of which is proportional to pulse width and direction of the signal electrically supplied through the cable 80.

Prior to instituting this automatic tilt angling operation the operator will set the range transmission, for example, in mid range M, and will also set the other controls for speed and power by close estimation according to his experience.

OPERATOR CONTROLS—FIG. 3

In this enlarged scale figure illustrating the operating console controls with greater particularity, all positions including park P for range shift lever 30 are shown, except for the unmarked neutral position N in which it is pivoted as actually illustrated. As shown in operative association with the lever 30, the out-of-neutral monitor microswitch 98 opens a circuit controlled thereby through lead 99 and signals that the range transmission is out of neutral N. Similarly a means may be provided to electrically indicate park P. The microswitch 98 is cammed closed by the lever pivot shaft 135 when in neutral N and thus interrupts the out-of-neutral signal.

A manual out-in plunger switch 137 carried by the handle of the power lever 18 has a spring biased, switchopen positlon when in its "out" position, as illustrated, corresponding to manual operation by the driver, the lever 18 being adjustable at will solely by him. But when thumb-depressed into the handle into its detented "in" position, not shown, the manual switch 137 closes, switching the power lever 18 into automatic operation as disclosed hereinafter.

As seen aligned in the console housing 143 with its companion levers 22 and 30, the power lever 18 is the only one which may move automatically. Interposed in the latter's arcuate path of movement is a limit switch 139 supported for adjustment in the arcuate slot 141 in the console housing 143. The switch may be mechanically positioned by the operator between the lever 18 and its LO idle position, and is electrically connected to prevent the power lever from further decreasing the power setting during automatic operation once it engages the limit switch but does not otherwise interupt automatic operation.

In the field, the operator sets the power lever 18 somewhere above the low idle position up to and including the wide open throttle position. The engine may be loaded or unloaded in the position set, depending upon tractor load requirements.

At the same time, the operator sets the transmission output speed lever 22 at a point between or including FAST and SLOW approximating the effective gear reduction expected to be required in the speed transmission while the range transmission remains in its aforementioned mid-setting. Then the clutch pedal, which in the meantime was depressed, is released with the speed differential between the sides of the mid-mounted clutch already automatically reduced and the tractor proceeds. The operator may then depress the push button switch and automatic operation of the power lever will commence as hereafter described.

Before entering into a description of the automatic modes of power lever operation and automàtic clutch control, it is first necessary to explain the automatic operation of the tractor transmission with manual control of the power lever. In its two automatic modes, the transmission ratio is adjusted automatically primarily to provide the lowest fuel consumption and secondarily to limit the transmission output speed and hence the ground speed to that desired speed set by the speed lever 22.

ENGINE RPM VS. LEVER POSITION—FIGS. 4A and 4B

These figures are a graph of actual engine speed plotted against engine power lever or throttle setting, all in revolutions per minute, the power lever setting representing the idle or no load speed for a given lever position. The particular engine is an International Harvester DTI-466B diesel engine. The power match curve 136 represents the desired engine speed at which the engine should run for each power lever setting. For example, point A is the desired engine speed, about 1800 rpm, for a power lever setting which would produce about 1950 rpm at no load.

The power match curve 136, which will be utilized by the microprocessor to control the drive train, although shown as a straight line can be configured as desired and tailored to provide the engine speed considered appropriate to the circumstances without regard to whether the desired engine speed represents a particularly optimum operating speed. However, the majority of the desired engine speeds of the power match curve preferably correspond to the speeds at which the drive train achieves its minimum specific fuel consumption. For simplicity herein, the minimum drive train fuel consumption will be considered to be the same as the engine minimum brake specific fuel consumption (BSFC) shown in FIG. 7 but in the real world of transmission efficiencies, the power match curve could be tailored to suit the power train specific fuel consumption. Further, the power match curve could be tailored to terminate, to depart from the minimum specific fuel consumption and follow the torque curve to achieve maximum engine power as in FIG. 7. The power match curve 136, when it does correspond to minimum BSFC, can theoretically never reach the no load condition curve 138 which shows higher speeds at all points because at no load BSFC is infinite.

Each power lever setting in the available range from LO idle to HI idle will have its own desired engine speed, thereby generating the power match curve 136. One example will typify the rest in the range.

EXAMPLE I

In this example, for an engine power lever setting in the MANUAL mode of 1950 rpm, the automatic tilt angling of the swash plate causes the engine to operate at operating point A indicated on curve 136 resulting in an actual engine speed of about 1800 rpm at a given load with the mechanical advantage afforded by the speed transmission.

That advantage, let us assume, occurs with an effective 1:1.5 gear reduction in the speed transmission. The control module 24 has two transmission control modes depending upon the condition encountered.

If the soil condition were, for example, to add more rimpull resistance to the tractor, a point B having an engine speed of, say 1700 rpm, might theoretically be reached for the 1900 rpm power lever setting. However, the control module 24 immediately senses the underspeed and begins its primary or power limiting mode of operation. The effective gear reduction ratio in the speed transmission is automatically changed for more reduction, for example to 1:1.7, obviously giving the engine more of a mechanical advantage so it can speed back up to the actual desired speed A, but naturally at the expense of slowing the tractor ground speed somewhat.

In other words, the temporary increase in load on the tractor would seem normally to demand reaction by the operator to advance his power lever setting and thus compensate with increased engine power output. But with automatic power limiting, the module automatically compensates without operator intervention and without the engine being lugged down in speed by the temporarily increased load.

When the rimpull resistance returns to the original value, the control module operates, in another phase of its power limiting logic mode, to sense the resulting tendency of the temporary actual gear reduction ratio to produce a higher engine speed than the calculated optimum represented at point A. To counteract this tendency to operate with too much effective gear reduction ratio and too high engine speed, the module automatically decreases the effective gear reduction ratio from 1:1.7 back to the initial lesser ratio of 1:1.5 appropriate to a higher tractor speed. That is, the engine is automatically afforded less of a mechanical advantage over the now-reduced load until the original condition is restored. It can handle a greater load at its power setting and is therefore loaded up to a greater amount, and the power match is restored right back to the desired engine speed. When the desired engine speed produces the lowest specific fuel consumption, it can be seen that extremely fuel efficient operation occurs by maintaining the engine at this speed.

A contrasting cycle, completed under a different mode of operation of the module, is to be taken up in the example now to be considered.

EXAMPLE II

Figure 4A:
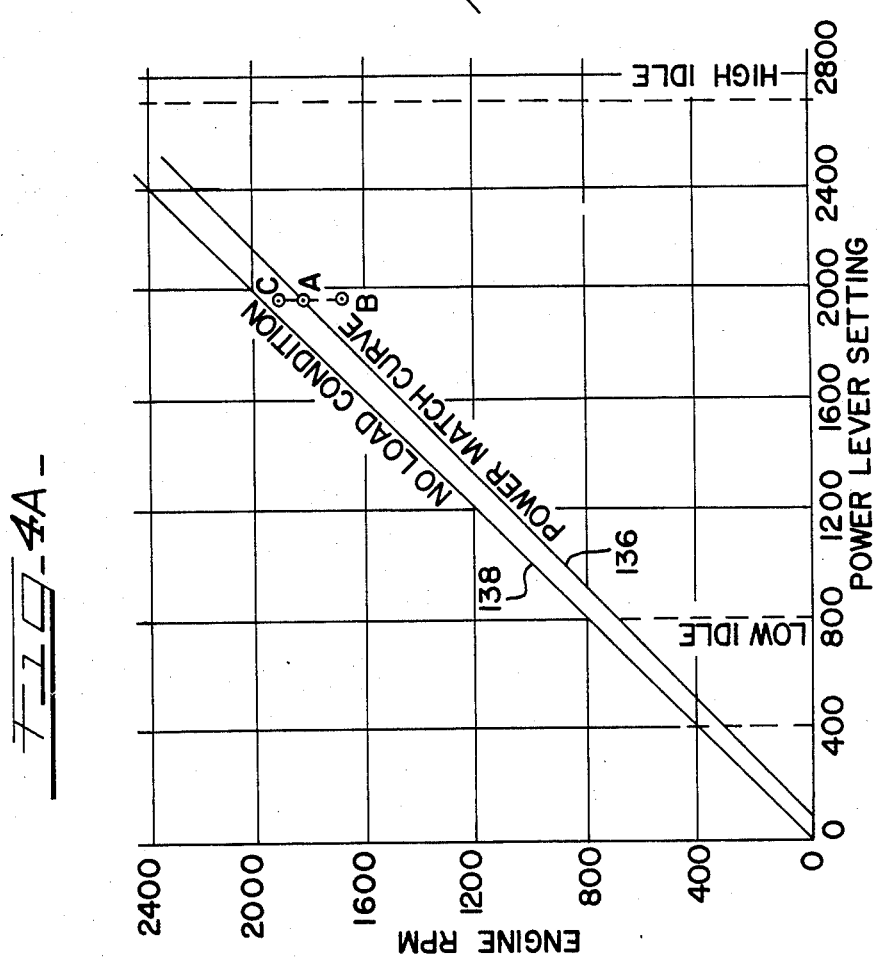

If, while operating at point A appearing in the graph shown in FIG. 4A, soil resistance stays the same but the tractor encounters a slight short downslope, as an example of a lightened load, the control module 24 enters into the second, or constant ground speed mode of operation. It does so because of the actual change of the operating point to point C, say, 1900 rpm, again with a power lever setting of 1950 rpm and an effective transmission ratio of 1:1.5. Engine speed-up on such a short downslope tends to cause a finite increase of ground speed, and the speed transmission automatically causes more reduction ratio, e.g., 1:1.7, restoring the initial ground speed desired. The speed control logic mode perforce continues because, all the while, the primary power limiting logic mode has been satisfied, that is, both the engine speed and the output or ground speed are at or above their desired values.

So the tractor compensates by reducing ground speed back down to the original ground speed whereupon, to continue with this example, the tractor then makes the transition by bottoming out at the end of the short slope.

The cycle is completed because, at the end of the slope, the operating point A is resumed. That is, the engine speed drops because of the increased load and the module automatically adjusts the transmission setting for less gear reduction back to the originally assumed 1:1.5 ratio. Thus, from a former optimum setting condition A, the tractor without operator intervention immediately made adjustment to hold constant ground speed when on the downslope, and immediately readjusted to the former optimum setting condition to keep that same constant tractor speed when off the slope.

The control module carefully monitors the power train and has means provided for programming it for the operating modes appropriate to the conditions being monitored. An explanation follows.

MODULE—FIG. 5

At the center of the control module 24 as shown in this figure is a microprocessor computer 140 having its own memory and proper programming for the operating modes required.

Inputs include a power supply 142 for regulated +5V input power, the magnetic transducer 84 adjacent gear 86 for engine speed rpm, the magnetic transducer 90 adjacent the clutch gear 92 for transmission output speed rpm, a +5V potentiometer 144 for monitoring the setting of the power lever 18, and a speed potentiometer 146 for monitoring the transmission speed lever 22 for its setting.

The outputs include the proportioning coil 134 for the swash plate pilot valve 132 for controlling the speed transmission and the power output cable 81 to the governor motor 83 for re-setting the power lever 18 automatically when the operator has switched it for automatic operation as discussed above.

B+ power is impressed on the +5V power supply 142 and, by a connection 148, is also impressed on a pulse width modulated swash plate drive circuit 150 m. A ferrite anti-noise bead 152 is present in the B+ lead to the power supply 142 and a tantalum capacitor 154 having one plate grounded is also present thereat to reduce high frequency electromagnetic interference from entering into the power supply 142. Also present is a series-connected reverse-polarity-detecting diode 156 to insure against damage in case the power supply is connected with wrong polarity to the source of B+. An electrolytic capacitor 158 having one plate grounded filters the B+ power. Also, a varistor 160 grounded at one side will, if optionally provided, protect against noise transients occurring from the B+ source from time to time.

A resistor 162 leading from the B+ power line is series connected to ground by a Zener diode 164 having a capacitor 166 parallel connected therewith and together serving as shunt series regulator to regulate voltage of the power supply.

A resistor 168 impresses the Zener voltage on the base of an NPN transistor 170 which, through its collector, delivers to the B+ power line electrons that its emitter is pumping from a junction 172 out of the base of a second NPN transistor 174. The NPN transistor 174 conducts electrons from the +5V linear voltage regulated terminal 176 through its emitter to the B+ power line through a collector connection to the latter, and incorporates a base bias resistor 178. Two series connected resistors 180 and 182 as supplemented by a paralleled capacitor 184 serve in conjunction with the transistors to define what the regulated linear output voltage will be at +5V terminal 176.

The clutch output speed cable 88 from the transducer 89 on range transmission gear 90 transmits therein an essentially sinusoidal wave which first encounters in two stages of the circuit a pair of RC filters 184 and 186. The wave then encounters a pair of oppositely poled diode clippers 188 and 190 which clip off the waves so that they are flat on top and on bottom, limited to about 1½V peak to peak. Further RC filtering at 192 is followed by directing the wave pulse as input to a schematically shown comparator 194. Full connections thereto are shown analogously by way of a counterpart comparator 196 grounded at 198 and receiving +5V through a terminal connected through a capacitor 200 to ground. The comparator 196 is connected to clutch input speed transducer 87 in the same manner.

The regulated linear +5 voltage is supplied through a resistor 202 to the output junction 204 of comparator 194, whereas another similarly supplied resistor 206 is connected to the output junction 208 of the counterpart comparator 196.

The output at junction 204 is the square wave indicated and, similarly, the output at the comparator 25 junction 208 is such a square wave. Those waves may range in frequency from 10 Hz to 7000 Hz and have digital form for ease in computing the comparative speeds at opposite sides of the mind-mounted clutch 92.

At the noted frequencies, the rpm signals of clutch input speed from 87 and clutch output speed from 90 are separately handled and analyzed by the microprocessor 140 by multiplexing, starting at their output junctions 204 and 208, respectively. A pair of diodes 210 and 212 bridging therefrom are joined in series cathode to cathode and their junction is connected to a junction 214.

A bias resistor 216 and base connector 218 from the junction 214 act in a way on an NPN transistor 220 so that, for example, the square wave pulses alone at 204 are ineffective to allow the transistor base to turn on transistor 220 through the diode 210. But the transistor 220 has a special inverter function when multiplexing due to its connection 222 of its collector to a pin 224 on the microprocessor 140 and also to the linear voltage regulator's +5V through a resistor 226. Thus, according to multiplexing procedure, the microprocessor 140, in order to measure input speed, has a pin 228 go positive in readiness as to when the square wave causes junction 208 likewise to go positive. At that point of coincidence, the inverter transistor 220 by inversion causes the pin 224 to go low, starting a timing cycle within microprocessor 140. That cycle counts the interval until the next coincidence between the positive (high) pin 228 and the positive-going square wave at 208, which causes the pin 224 on microprocessor 140 to go low again so as to terminate the timing interval. The input speed is at once determined by microprocessor 140, whereupon it causes another pin 230 connected to junction 204 to go positive so that the microprocessor 140 can similarly determine the clutch output speed from the tooth speed of the turning gear 90. The cycle repeats about sixty times per second in the microprocessor.

In the same manner, engine speed is monitored by magnetic transducer 84 associated with gear 86. Engine speed lead 82 supplies a comparator circuit 97 similar to the clutch speed circuits which then supplies a proportionate engine speed signal to the microprocessor 140.

The power lever 18 appearing in FIG. 5 has a mechanical linkage which has heretofore been described for making changes in the power setting of the engine through governor 19. With an electronically controlled fuel pump, such changes might be directly accomplished without a governor linkage. However, it is probable that a power control lever would still be present. Separately, the electrical connection 76 by means of the potentiometer 144 serves as the means of constantly monitoring the power lever position and hence the engine governor setting.

A pull down resistor 232, appropriately grounded, provides for fault protection to the potentiometer power lead 76, as in the case of a broken wire, for example. Two stages 234,236 of RC filtering are present in the power lead, and also present are a pair of series connected clamping diodes 238,240 poled as shown to protect the power lead against noise spikes; finally, a current limiting resistor 242 leading from the clamping diodes' midjunction delivers the monitored power lever voltage setting signal to an analog to digital converter 244. The analog to digital converter 244 is commercially available under the National Semiconductor designation ADC0833 and is found to perform satisfactorily. Linear voltage regulated to +5V is supplied to the converter 244, suitably bypassed for noise and other protection purposes by a resistor 246, a filter capacitor 248, and an RC network 250. The converter 244 supplies input as a digital signal to the microprocessor 140 through the various pin leads 252 which are supplied through resistors 254 at +5V by the linear voltage regulator.

The transmission speed lever 22 is digitally monitored in the same way by the converter 244, and also supplies its own digital command signal through the microprocessor 140 to proportioning coil 134 for direct control through pilot valve 132 of the swash plate tilt angle. There are no mechanical connections between the speed lever 22 and the pilot valve 132 similar to that of the power lever, only electronic control over the swash plate.

A watchdog circuit 256 operates through a comparator and a NOT gate 258 as a timer to restart the microprocessor 140 in a conventional manner in case something goes wrong.

The microprocessor 140 receives through its input pin 262 the necessary power to run it from the +5V linear voltage regulator. An adjacent pin 264 is connected to the regulator by a decoupling capacitor 266 for blocking power source noise. Another adjacent pin 268 is connected by a resistor 270 to the +5V linear voltage regulator for biasing the microprocessor 140 constantly to use its aforementioned internal memory. The required input crystal, a CPS Knight, which is connnected in standard way is omitted from the showing of the microprocessor 140 in FIG. 5.

The transistors employed in the pulse width modulated swash plate drive circuit 150m of FIG. 5 are all of the NPN type except 292 and 314 which are of the PNP type. Of the two service connection junctions 272 and 274 of that circuit, the junction 272 has among others, a connection to an output pin 276 on microprocessor 140, a connection through pull-up resistor 278 to the +5V linear voltage regulator, and a connection to the base electrode of a transistor 280. The transistor emitter is connected to a ground line 282 and the collector is connected through a resistor 284, a junction 286, and a resistor 288, to a B+ junction 290 supplied by connection 148.

The second transistor 292 (PNP), the base electrode of which is connected to junction 286, has the emitter connected through a resistor 294 to the B+ junction 290 and has the base connected through the respective cathode-anode of a diode 296 and the respective cathode-anode of a series connected diode 298 to the B+ junction 290. The elements 294, 296, and 298 provide current limiting protection to the second transistor 292. A pair of series connected clamping diodes 299 and 300 provide a cathode to anode and another cathode to anode connection down from the B+ junction 290 to ground line 282; they protect against noise spikes and have an intervening junction 302 connected to the collector electrode of the second transistor 292.

In operation, microprocessor 140 causes pin 276 to go high at the same time that it causes junction 274 to go low. The pull-up resistor 278 goes to the same +5V potential at its opposite ends and the correspondingly high junction 272 positively biases the base of transistor 280 so that it conducts. Accordingly, the resistor 284 goes less positive, at its end connected to junction 286 and causes the base of the PNP second transistor 292 to bias the latter into conducting. So a positive rectangular wave pulse, of modulated width determined by the microprocessor 140, is transmitted from the intervening junction 302 so as to be passed by the output cable 80 through the proportional coil 134 of the pilot valve 132. Suitable cable connectors are indicated in the cable at 304 and suitable anti-noise ferrite beads are indicated therein at 306.

The circuit from coil 134 is completed to ground line 308 in the rest of the circuit in which, because service connection junction 274 is momentarily low, the circuit's respective transistors 310, 312 (NPN) and 314 (PNP) are base biased respectively negatively and positively so as not to conduct. A pull-up resistor 316 is connected between the +5V linear voltage regulator and the base of a transistor 318 and, unimpeded, gives positive base bias to the transistor 318 causing it to conduct and discharge the positive rectangular wave through a resistor 320 thus completing the circuit to ground line 308. The transistor 318 is protected in the usual way by the resistor 320 in conjunction with another transistor 322 which together form a current limiter on the transistor 318.

The positive rectangular wave ceases when the pin 276 allows the service connection junctions 272 and 274 to reach the same potential levels. The next pulse starts after a predetermined interval, and so forth for the successive pulses in the positive direction as long as continued by the microprocessor.

Negative pulses, in succession, are started with successive operation by the microprocessor 140 causing junction 274 to go high at the same time as junction 272 goes low.

The cycles are repeated in either direction and, with pulse width modulation as determined by the microprocessor, the proportional coil 134 receives an average positive current or negative current or no current as a proportional thing, causing proportional fluid directing action by the servo valve 132 acting as pilot valve.

The purpose of the swash plate drive is to provide amplified electrical hydraulic actuation with precise control. The high-low microprocessor output means that the pin such as pin 276 is impressed with +5V or OV at extremely low current carrying capacity. The B+ voltage impressed on the drive circuit 150 m can fluctuate on the tractor at anywhere from 9 to 16V whereas, despite the current amplification provided by the transistors, the proportional coil 134 is rated at only 7.5V which is the most voltage ever impressed upon the coil terminals by the electrically amplifying transistors. Hydraulic amplification in the pilot valve 132 as shown in FIG. 2 greatly increases the force possible because of responsiveness of the piloted servo valve 130 which readily handles the moving and stopping load under which the swash plate is forced to operate.

The control module 24 as shown in FIG. 5 is not confined to any set number of steps or inflexible sequence or order for its operation, although one flow chart for ease of understanding will be given, simply by way of example and not limitation.

LOGIC FLOW CHART—FIG. 6

The starting point for the control module's automatic operation is the proportional control voltage picked off the potentiometer 146, varying with transmission speed control lever 22 as it positions the slider illustrated, and applied as monitored, according to block 324, is the desired clutch input or speed transmission output speed command. The next block 326 of the FIG. 6 flow chart indicates the monitoring of actual engine speed before gear reduction, depending at outset of the automatic operation strictly upon the operator's positional setting of the power lever and existing load on the tractor at the time. The converter block 328 next following represents an operation within the microprocessor of constantly recalculating a control parameter, the commanded speed reduction ratio of the speed transmission or command ratio, determined as the quotient of desired speed from block 324 divided by actual speed from block 326. A further crucial block 330 represents constant monitoring of the power lever setting as initially set by the operator at his desire for the general operation he seeks.

The calculation block 332 next following in the sequence represents use of the power lever setting as parameter for the recalculations, updated sixty times per second, of the desired engine speed based on the power match curve 136, in this case providing the least brake specific fuel consumption for that particular setting of the power lever.

The logic path 341 next encounters monitor blocks 325 and 327, leading through path 345 to Reference Ratio Converter 323 and interrogatory diamonds 329 and 331, which, along with modify blocks 333 and 343 relate to the automatic clutch control feature to be discussed after a consideration of the basic operating modes of the system.

Thus, assuming the transmission is out of neutral and the clutch is engaged, the logic path comes to diamonds 334 and 335 which represent the microprocessor's digital signal comparison of actual engine speed to the desired engine speed as scaled numbers. If the actual engine speed by comparison is equal, there will be no change at point of the diamonds 334 or 335 or in the desired speed command ratio being transmitted to block 336. However, if the actual engine speed drops below the desired engine speed due to increased load, a Yes is generated in diamond 334 which turns on modify block 338. Specifically, the microprocessor is programmed automatically to modify the command ratio signal so as to call for more gear reduction, increasing the mechanical advantage and thereupon restoring actual engine speed to equivalence with the desired engine speed as then calculated by the microprocessor.

To reach its signal modification step (338), the microprocessor 140 is programmed to detect some predetermined value of underspeed error reached at the preceding logic stage of simple digital comparison (334), before operating swash drive circuit 150m to produce the unmodulated or maximum width, DC rectangular wave pulses. Lesser or zero errors sensed by microprocessor 140 result in modulated drive wave pulses of digitally proportionally lesser or zero width, respectively.

So the command ratio, modified or unmodified as appropriate, is transmitted (in ratio form as the desired clutch input speed divided by sensed actual speed) on to the monitor block 336 which monitors and computes the actual ratio. Unimpeded, that command ratio as a digital signal will be transmitted through monitor block 336, to compare block 340, and thereupon utilized, if necessary, by blocks 350 and 352 or 360 to move the swash plate to bring the actual speed transmission reduction ratio (after gear reduction/before gear reduction) and the command ratio (desired clutch input speed/actual engine speed) into equivalence.

So now the engine speed has been brought back to the desired speed and so, a "No" exists at diamond 334. However, because the command ratio is now less than the desired command ratio, i.e., the ratio based on the desired transmission output or clutch input speed set by the speed lever 22, the system remains in power limiting logic mode. A "No" answer also results from compare diamond 335 and so stable operation results, again with fuel efficiency.

When the additional load is now reduced, the engine will have a tendency to speed up. So now a "Yes" answer will result in compare diamond 335 which leads to compare diamond 337 which asks if the commanded ratio is still modified, i.e., is it less than the desired command ratio. A "Yes" result here leads to modify block 339 which modifies the command ratio for less reduction to bring it closer to the desired command ratio. When it reaches equivalence with the desired command ratio, a "No" answer will result from diamond 337 and the microprocessor will shift into speed mode if the engine speed is still higher than the desired engine speed. Until that equivalence is satisfied, the microprocessor will be operating exclusively in its programmed power logic mode although, in the meantime, the suppressed, second speed logic mode earlier mentioned will be continually operating entirely subordinate to, and over-controlled by, the dominant-priority power logic mode.

A means can be and preferably is provided in the power limiting logic to achieve yet finer control while satisfying the logic paths discussed above. This is by use of an integrator circuit to detect the engine speed changes indicated by compare diamonds 334 and 335. Thus, the integrator accumulates the difference between the actual engine speed and the desired engine speed from diamond 334 each time the microprocessor runs through its logic and creates a larger and larger negative error, and thus more and more modification by modify block 338 until the actual speed equals the desired speed and no further error is accumulated. When the compare diamond 335 is activated by the engine speed exceeding the desired speed and thus produces a positive error, this also is accumulated but reduces the negative error, and thus the command ratio modification, until the error becomes zero. As before, further positive error results in the microprocessor entering the speed mode.

So the monitor blocks 330 and 332 for the power logic as indicated continually monitor the desired engine speed and, as represented by compare diamonds 334 and 335, the comparison is continually being made to sense when the power logic mode modified signal to the transmission has brought the actual engine speed back up to the desired engine speed (satisfying the power match curve and the command ratio up to the desired command ratio (satisfying the speed lever 22). When that point is sensed, and when the desired engine speed is exceeded with the power logic mode remaining satisfied, the microprocessor goes into its speed logic mode, bypassing blocks 338 and 339.

Because the actual clutch input speed and actual engine speed are constantly known, the block 336 representing constant monitoring of the actual speed reduction ratio functions in the same way as block 328 for the command ratio. Therefore, the actual ratio from block 336 and the command ratio from block 328, when compared at the step represented by diamond 340, will in the ideal case find equivalence of digital signal when the main command signal is modified just right. Diamond 359 and block 361 relate to automatic clutch control and will be discussed later. So the cycle will be repeated rapidly again, and again, just as soon as the repeat paths 342 and 344, the exit path 346, and thence path 348 leading through the microprocessor make their first completion.

In case the engine would speed up beyond its desired speed, as in the tractor encountering a downslope, the speed logic mode reacts through the blocks 326, 328, 336, compare diamond 340, diamond 350, and modify block 352 to cause more gear reduction; in other words, the engine speed-up, causing point C (FIG. 4A) to be reached, decreases the command ratio by raising the denominator, engine speed, so that by comparison the actual reduction ratio by staying the same becomes the greater ratio of the two, relatively speaking.

Therefore, as caused by the slight downslope of Example II, the greater effective gear reduction required in block 352 is achieved by appropriately modifying the actual ratio at that point and the thus modified actual ratio signal is transmitted as the new output in path 354, 356 thus changing the proportional coil 134 and swash-plate tilt angle into some less positive angular direction to increase the reduction to account for the higher engine speed. So the constant ground speed is sustained as desired on the slight downslope. If the engine speed decreases, as when the tractor levels out, the command ratio will then exceed the actual ratio and the signal will go from compare diamond 350 to modify block 360 which will modify the ratio to less reduction. To maintain the constant ground speed, this operation continues until the engine speed comes down to the desired speed.

AUTOMATIC CLUTCH CONTROL

Automatic clutch control, in accordance with the invention, is achieved by eliminating or minimizing the speed differential between the input and output sides thereof before engagement through modification of the speed transmission actual reduction ratio in a similar manner to that described above.

To that end, there is interposed in the logic path 345 of FIG. 6, a reference ratio converter 323 following the clutch input speed monitor block 325 and the clutch output speed monitor block 327. The reference ratio converter continually calculates the ratio between the clutch output speed and the engine speed. The logic path continues through the range transmission "out-of-neutral" diamond 329, which requires a "yes" answer for automatic clutch control, and "clutch-engaged" diamond 331, which requires a "no" answer for automatic clutch control, to modify block 343 wherein the microprocessor 140 modifies the command ratio to make it equal to the reference ratio. Since the actual ratio (clutch input speed/engine speed) is modified through blocks 352 or 360 to become equal to the command ratio which is now equal to the reference ratio (output speed/engine speed), the clutch input speed is synchronized, by the speed transmission, to equal the clutch output speed. The ideal time for accomplishing this synchronization is when the range transmission has left neutral to complete a shift but the clutch is not yet engaged. Hence, the required Yes and No answers from the transmission "out-of-neutral" diamond 329 and the "clutch-engaged" diamond 331.

Alternately, the transmission switch diamond 329 when the transmission is in neutral has an appropriate No path which includes a block 333 and which bypasses command modification block 343 thereby preventing synchronization. That block 333 remains unused, or can represent being put to service to set a command speed for the clutch input so that the hydrostatic motor is at a zero-speed point.

Also alternately, the clutch switch diamond 331 when the clutch is engaged has an appropriate Yes path which corresponds to the operating logic and which completely bypasses command modification block 343 thereby preventing synchronization. Effort to pre-synchronize an engaged clutch would not only be in vain but also wasted because of input and output speeds being inherently matched.

The flow chart steps are the same, whereby the actual ratio follows the command ratio, both in this special case of command ratio being made to equal the reference ratio as just considered as well as the heretofore described general case where the command ratio responds to fuel consumption concerns. In the special case of the automatic clutch control, the clutch input side would require being speeded up by the speed transmission during the downshift of the range transmission which would greatly accelerate the disengaged clutch at its output side. With the command ratio equal to the now higher reference ratio, the actual ratio across the range transmission will be less than the command ratio, the question asked by diamond 350. The Yes answer leads to block 360 wherein the actual ratio is modified, by changing the swash-plate, to reduce the reduction and thus increase the clutch input speed to match the clutch output speed.

In automatic clutch control, the clutch input side would require a slow down during a range transmission upshift which would appreciably reduce the speed of the output side of the clutch. Thus, the command ratio, equal to the reference ratio during shifting, would be less than the actual ratio. So a "No" at diamond 350 would lead to block 352 and a modification of the transmission ratio for more reduction thus slowing the clutch input speed. In other words, upshifting is a succession of recoupling to a range transmission input temporarily brought down in speed by load to a speed transmission output at the same speed and bringing the range transmission gradually back up to speed in the desired way of gradually accelerating the load accomplished as the command ratio is modified following clutch engagement to accommodate operating conditions.

The compare diamond 359, represents a safeguard step of deciding if the engine speed is at least 600 rpm. If so, the Yes path down to compare diamond 340 shows it is still in order to compare ratios and keep modifying the speed transmission settings automatically as needed. However, the tractor hydraulic system when driven by an engine at only 600 or less rpm might prove borderline and also might, but not necessarily so, cause inadequate responsiveness in the two-way, closed center piloted valve 130 which hydraulically sets the swash plate angle. So the No from compare diamond 359 leads in a path completely bypassing compare diamonds 340, 350 and including a signal interruption block 361 preventing ratio change signals from reaching the speed transmission. So the valve 130 remains inactivated, closed, and leaves the swash plate undisturbed in its existing setting until engine speed is resumed appropriate to insuring that the hydraulic system is back up to pressure.

MIN. BSFC CURVE—FIG. 7

The wide open throttle torque curve indicated at 362 in this figure is representative of automotive diesel engines in general use, such as an International Harvester DTI-466B engine. The points JKL indicated on the curve bear noting.

Without the power limiting logic mode, upon increased torque requirements on the tractor, the engine speed would drop off gradually until the engine approached its peak torque point J.

The general idea of the power limiting mode taught herein is to keep down-shifting a variable transmission as it loads up to stay on the power match curve corresponding to the minimum specific fuel consumption of the power train as well as for readjusting the power lever when needed so that the engine will actually positively follow all points defined by a least BSFC curve. The result is reduced fuel consumption. For example, the essentially straight portion of torque curve 362 defined at rated power by points K and L will be seen closely to parallel the constant 180 HP (135 kW) broken line and the constant 200 HP broken line appearing in FIG. 7A. But operating at full-throttle as indicated at point K (approximately 190 HP) would consume excess fuel, according to the graph.

What is significant and more desirable, is operating the same way but automatically at point L which in some instances will be accomplished at a 5 percent fuel saving, nevertheless developing about the same 190 HP. That fuel saving has been observed in one or more tractors embodying the present invention.

Figure 7:
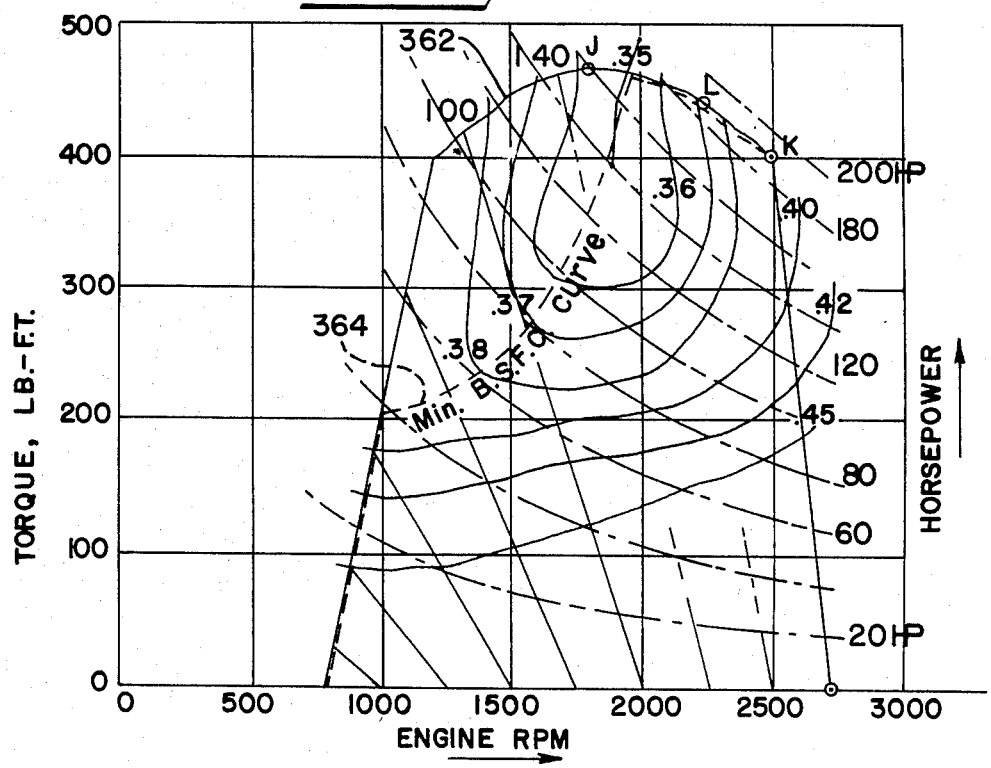
FIG. 7 is an engine rpm-torque graph showing rated power torque, with superposed plots thereon of the governor droop curves, constant BSFC loops, and the discerned pattern of least BSFC points, the locus of which generates a single discrete minimum BSFC curve.

Superimposed on the graph of FIG. 7 are the diagonally upwardly and leftwardly extending straight governor curves, starting from the bottom for instance as 1000 engine rpm, 1500 engine rpm, 2000 rpm, etc., corresponding to different settings of the power lever 18.

Also superimposed are the known, seemingly concentric constant brake specific fuel comsumption curves, rather much centering in regular way about the 0.35 curve indicative of 0.35 pounds (0.16 kg) of fuel consumed by the engine per horsepower hour. Radially outwardly therefrom appear the surrounding curves marked for respectively 0.36 pounds, 0.37 pounds, 0.38 pounds, 0.40 pounds, 0.42 pounds, and 0.45 pounds (0.20 kg) per horsepower hour.

Returning to the constant horsepower lines (broken), we can perceive that the 60 horsepower line is closest to the 38 pound curve at only one point, the 80 horsepower line is closest to the 0.37 pound curve at only horsepower one point, and so forth. That resulting pattern of points establishes the locus of points for a smooth broken line curve 364 joining all such points and being adjacent at the upper right end to the 0.35 pound curve, the lowest fuel consumption shown. It follows that such curve 364 is truly representative of near-minimum brake specific fuel consumption for the engine throughout the entire range of horsepowers enveloped by the wide open throttle torque curve 362 for the engine.

The minimum BSFC curve of FIG. 7 readily corresponds to the conveniently smooth power match curve 136 based thereon and which therefore represents a predetermined consecutive series of desired engine speed values productive of substantially minimum brake specific fuel consumption for the range of engine power settings. The power match curve 136, not the BSFC data, might then be stored in the microprocessor memory as a rough table, if the memory is somewhat restrictive, or with extensive memory capability digitally stored with only incremental differences in the speed values not requiring interpolation. However, in the present microprocessor 140, the relatively linear power match curve 136 is expressed as a simple engine speed equation and enables the microprocessor constantly to resolve the equation for solutions in precise digital terms for each and every setting to which the power lever 18 is adjusted. So the desired engine speed becomes a function of the power lever setting in the equation, the setting constituting the variable control parameter of which the changing values are constantly being entered in the equation by the computer for recalculation of same.

The wide open throttle curve of the torque of a combined engine-transmission train having infinite variability actually consists of an infinite number of curves constituting a family which keeps peaking more and more with more speed reduction in the infinitely variable transmission; the reason is the torque capability at the output shaft naturally becomes higher and higher with succeeding increases in transmission gear reduction ratio.

POWER TRAIN CURVES—FIG. 8

In the graph of this figure with transmission output torque plotted against transmission output speed, only three curves appear of the wide open throttle torque for the overall engine-transmission combination.

At the transmission's least speed reduction ratio which is essentially 1:1, the torque curve 366 therefor closely approximates the torque curve of the engine alone and would be identical thereto if the transmission ratio happened to be exactly 1:1. The least BSFC broken line curve 368, which is also the power match curve, is readily superimposed as in FIG. 7 and corresponds only to curve 366. The overall torque curve 370 is shown for a transmission reduction ratio of 1:1.5. The broken line least BSFC curve 372 is readily superimposed appropriate only to the curve 370 and that transmission reduction ratio.

Finally, for visual comparison at the other extreme, the overall train torque curve 374 represents the condition of the transmission providing maximum gear reduction of 1:2.39 for greatly multiplying torque and rimpull. The appropriate least BSFC curve is plotted in broken lines at 376. A pattern of points WXY emerges establishing the locus of least fuel consumption points connected by a smooth average curve 378 for the entire reduction range of the present speed transmission.

Figure 8:
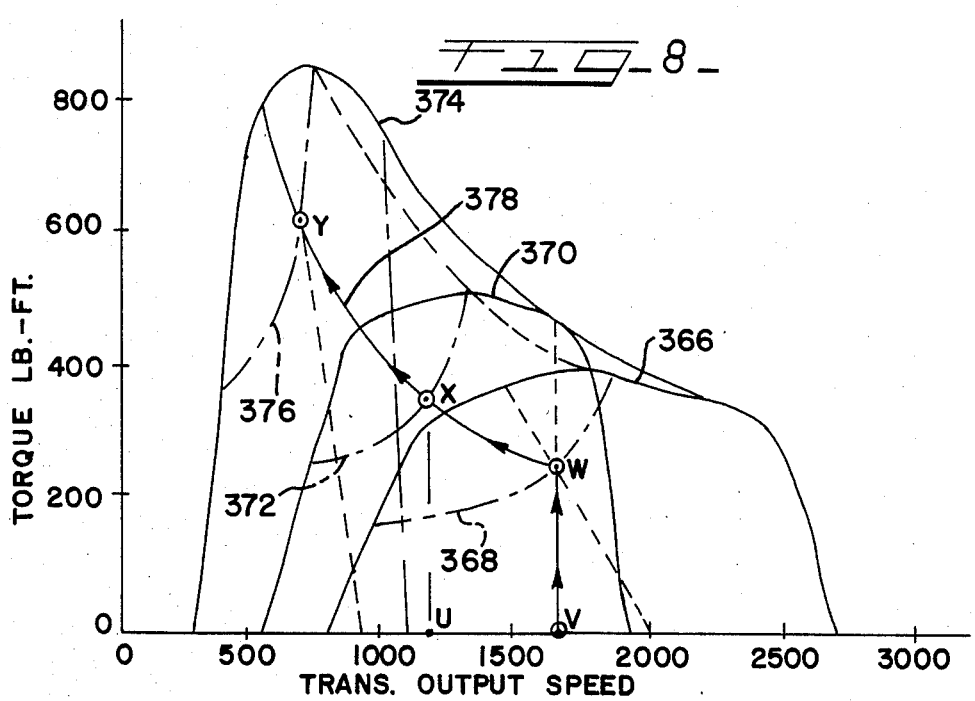
FIG. 8 is a transmission rpm-torque graph showing wide open throttle torque for three arbitrary but representative transmission gear reduction ratios, each with its individual superposed least BSFC curve, and the discerned pattern of least BSFC points for a given throttle setting, the locus of which generates a discrete single line anti-lug curve.

As viewed in FIG. 8, the diagonally upwardly and leftwardly directed straight broken lines represent the engine governor limited portion of the individual overall drive train torque curves of the engine-transmission train. As will be seen, during automatic operation, the transmission output speed or ground speed does not follow that portion of the torque curve (although the engine does).

It can be seen that from the zero torque point U on the transmission output-speed axis that an increase of torque straight up to point X on the reduction range curve 378 will result in minimum brake specific fuel consumption at that point for the transmission setting of 1:1.5 speed reduction. If increased ground resistance to wheel speed causes the control module hereof automatically to provide more gear reduction in the speed transmission, the transmission can readily accommodate as the operating point viewed graphically rises up the curve 378 toward Y thereon while maintaining minimum specific fuel consumption.

The starting point W for the overall train torque curve WXY can be considered typical and represents specifically the assumed initial condition of a steady load, a speed lever setting fixed for transmission output speed of 1650 rpm and a power lever setting fixed for 2000 rpm so that the engine under automatic operation is being run at the desired speed from the power match curve at corresponding minimum BSFC of approximately 1650 rpm, which is the same as the output speed because point W is on the curve 368 correscorresponding to a 1:1 ratio. To hold to the latter engine speed, despite increases in the load, is to hold to near-minimum specific fuel consumption. Because power match curve 368 has an infinite number of points W thereon available as starting points, depending on the power lever setting, the family of overall drive train torque curves akin to WXY is of infinite number and not attempted to be illustrated.

EXAMPLE III

An extreme example now given brings out the full adjustment capability of the present automatic power matching train operation. Speed logic is a straightforward way of establishing the stabilized initial condition, point W, just set forth. So in speed logic mode and despite governor droop, and from a transmission ratio of roughly 1:1.2 at point V on the FIG. 8 graph, the constant ground speed or second mode of operation will continue to change the transmission ratio to attempt to maintain a constant transmission output speed when the clutch is engaged and torque increases up toward operating point W as rimpull load is increased. Meanwhile, the engine speed is being slowed by the load to the above-assumed 1650 rpm. Thereafter, the power limiting logic mode goes into effect automatically as result of the tractor's reaching its load and a very slight undershoot of the 1650 rpm point and maintains the tractor operating at W as desired on the WXY curve 378.

Specifically on the reduction range curve 378 for the speed transmission, already producing minimum BSFC in the engine, the transmission upon encountering increased resistance is caused automatically to introduce more gear reduction and, at reaching of the operating point X, the transmission will again have the engine operating with minimum BSFC still at 1650 rpm, but at an adjusted transmission ratio of 1:1.5. Further resistance increase of the tractor load shifts the operating point to approach Y, progressing thereto smoothly and always along the reduction range curve 378. And the full multiplication of torque, with a torque rise by 2.39 times, occurs with the reaching of point Y.

The significance is that, while on the WXY portion, the engine does not lug; it operates always and only on points on the curve WXY at the least BSFC speed, 1650 rpm, and entirely automatically with the same manual power setting and with no change from or intervention by the operator. The return pattern, on the same curve W,X,Y and equally efficiently, begins as soon as the extreme of 2.39 torque multiplication is no longer required for sufficient rimpull of the tractor.

The striking part of this mode of automatic operation is that the operator never detects the engine laboring even though tractor speed naturally slows during a stretch of highly burdensome soil resistance because the engine speed and torque output do not change significantly. It will be appreciated that in the contrasting constant ground speed mode, as from point V to W, the engine speed and torque output do vary.

EXAMPLE IV

There is a relationship between the modify block 360 of flow diagram FIG. 6 and the transition indicated by arrows from point V straight up to point W in FIG. 8. The control module operates in the second constant ground speed mode beginning at point V where it compares the actual ratio with the command ratio and finds that, under increasing torque loading and as the engine slows down, the actual ratio is the lesser. So less actual gear reduction is required than the existing 1:1.2 ratio and the transmission moves toward establishing a 1:1 gear reduction ratio at the time the operating point W is reached while maintaining constant speed. Therefore, the so-called governor droop illustrated by the natural, broken line, diagonal governor curves is avoided in the power train output.

EXAMPLE V

The transmission in its secondary speed mode also desirably operates in the opposite direction, and automatically does so according to modify block 352 in flow chart FIG. 6, in going through the opposite transition from point W straight down at constant speed toward the aligned zero torque point V, FIG. 8. The circumstance is the gradual removal of appreciable torque-loading on the transmission and a thus increased engine speed so that the actual ratio sensed is greater than the command ratio and is readily determined according to the notation between compare diamond 350 and modify block 352, FIG. 6. So, counter to the direction of the arrows, and with constant ground speed maintained between W and V, FIG. 8, the automatic operation changes the transmission from 1:1 at W to a 1:1.2 at V for more gear reduction to counteract the natural loss-of-load speed-up of the engine. The slowing-down transmission and unloaded engine speed-up will offset one another, with constant ground speed maintained all during the transition.

By flow chart, FIG. 6, the step represented by block 352 is to modify the actual ratio starting at that point W and the thus modified actual ratio signal is transmitted as new output in paths 354 and 356, thus changing the proportioning coil 134 and swash plate tilt angle into some less positive angular direction for more effective gear reduction.

EXAMPLE VI

This example is merely cumulative to Example II preceding, but importantly illustrates what can be carried to an extreme situation very possibly encountered. Let it be assumed that the present tractor is proceeding easily on a slight slope with a heavy wagon lightly in tow, with the power train automatically operating with practically no reduction, let us say a ratio of 1:1 for simplicity. The tractor and tow immediately encounter an extended severe downhill condition so as to operate at some unmarked point vertically over point C, FIG. 4A, a motoring point above no load curve 138, that is, the wagon is pushing the tractor. The power mode is fully satisfied because the control sensors of the microprocessor serve only to assure it, while in that mode, that the actual engine speed is kept up to desired speed or, in graphical terms, that speed remains on or above the power match curve 136 in FIG. 4A and the command ratio is equal to or greater than the desired command ratio.

In this assumed situation, the actual ratio becomes the larger than the command ratio and gives rise to a signal which can be represented by the reaction of block 352 as required in the FIG. 6 flow chart. Consequently, as the rolling wagon tends to force the tractor downhill faster, a modified actual ratio signal from block 352 is transmitted in paths 354, 356 to cause the swash plate to establish more and more effective gear reduction up to approximately a 1:2 or perhaps a 1:2.39 ratio. The engine is thus being motored to increasing speeds through the transmission by the wagon and tractor due to their downhill coast. So the full braking torque capability of the drive train is brought to bear automatically in the speed mode to ensure positive vehicle control.

By way of departure from the earlier presumption of the range transmission always being in the medium or mid range M, it remains entirely in the operator's province to upshift and downshift at will (FIG. 3), as when the speed transmission is approaching full positive angularity in its speed overlap with the HI range or full negative angularity in overlapping the LO range (FIG. 2). So when the load becomes such that the speed transmission's range can no longer automatically accommodate the tractor's operation the way is always open for the operator readily to restore the speed transmission to within its effective speed ratio range by shifting into HI for the lesser rimpull loadings or into LO for any excessive loadings.

Or an easier way is open, for effecting rather substantial changes, through power lever adjustment which can readily be brought about automatically to restore the near-minimum specific fuel consumption and constant ground speed operation desired.

AUTOMATIC POWER LEVER OPERATION

FIG. 4B enlarges a portion of the FIG. 4A graph of actual engine speed plotted against engine power lever or throttle setting. On the power match curve 136, the illustrative point A represents the power match point at which a power lever setting of 1950 rpm produces an engine speed of about 1800 rpm if sufficiently loaded to be in the power limiting mode. This steady match between load power required and engine power delivery at minimum BSFC is ideally desired and would hold, except that some operational variable will inevitably change.

EXAMPLE VII

If, while the power train graphed is operating at matched power point A, a significant decrease in soil resistance or a moderate downslope or both are encountered, the control module 24 is capable of entering into an operating mode reducing the setting of the power lever 18. This occurs automatically when the speed of the more lightly loaded engine increases toward the no load condition curve 138 toward point E, which is entirely outside, on the high speed side, of a power lever deadband 380 graphically appearing as a cross-hatched envelope above, and parallel with, the power match curve 136. The so-called width of the deadband is illustratively shown as amounting to about +50 rpm above all corresponding points on the power match curve 136. The deadband does not extend below the curve 136.

More particularly, as the sensed engine speed increases above the deadband 380 for the power lever, and at the same time that the speed mode is adjusting the transmission ratio to maintain constant tractor ground speed, the control module 24 also begins to cause a power lever setting reduction which continues until the engine reaches that reduced setting where the load is precisely sufficient to bring engine speed directly down into intersection with the deadband 380 as indicated at the desired point F.

At or just below this new operating point F, the module 24 continues in its regular speed mode of operation to keep the transmission adjusted for the new power setting, to maintain constant tractor ground speed at the desired speed as long as the engine speed is no lower than its point of intersection with the closely adjacent power match curve 136. The control module 24 is rendered more sensitive in its speed mode because of this extra fine tuning while automatically adjusting the transmission ratio in incremental amounts within the range graphed. It should be noted that the point E can only be reached transiently and is not a steady state operating point.

EXAMPLE VIII

In this contrasting example, and from operating point A at the outset, let us assume the plowing resistance of the soil increases which would cause engine speed to drop transiently toward point B, below the power match curve 136. The control module 24, in its power limiting mode described above, immediately begins to change the transmission ratio for more reduction to raise the engine speed to its desired speed point A, which effectively reduces the clutch input speed and tractor ground speed. The control module 24 further monitors the change in the command ratio and when that ratio falls below the desired command ratio, i.e., the ratio based on the desired clutch input speed set by the speed lever 22, causes a power setting advance.

When the power lever setting is advanced, the engine accelerates and the engine speed exceeds the power match curve 136 shifting the command module into the speed mode which increases the transmission reduction to account for the increased engine speed and so a new steady state operating point H is reached with the engine operating at a new desired speed on the power match curve FIG. 4B.

The details of the structure of the power lever, and the logic or flow chart programming for the microprocessor to control the power lever as well as the effect of automatic power lever operation on the power train torque curves are beyond the scope of the invention of this application. However, such structure, logic or flow chart programming, and power train curves are described and discussed in great detail in U.S. parent application, Ser. No. 620,762 filed June 14, 1984, which is hereby incorporated by reference. In comparing that disclosure, it will be appreciated that "transmission output speed" there is clutch input speed here. For purposes of the present invention, it is enough to know that if the engine speed exceeds, by more than 50 rpm the desired engine speed calculated by the microprocessor (based on the power match curve 136), the automatic power lever setting will be reduced. If the actual ratio of the speed transmission is reduced, in the power limiting mode, more than 2 percent below the desired command ratio, the automatic power lever setting will be increased. If the latter appears complicated, a simplified, though not totally accurate, way of looking at it is that if the desired ground speed falls more than 2 percent below that ground speed which has been set by the speed lever 22 (for a particular gear of the range transmission), the microprocessor, under normal operating conditions, will increase the throttle or power lever setting.

Incremental adjustments will be fine tuned into the power train through appropriate incremental transmission ratio changes by the module, which is more sensitive in its power limiting and speed modes compared to when it causes power setting changes.

Because it constantly monitors actual engine speed and constantly monitors the nominal power setting, the control module 24 can not only program the power setting in accordance with the power match curve resulting in minimum BSFC but also is provided with power means for automatically changing the power lever position at least part way toward such a setting.

POWER LEVER MOTOR CONTROL—FIGS. 1 and 5

As shown electrically connected by the power cable 81 to the motor control circuit output terminals 379, 381 of the control module 24, a preferred power means is a reversible DC motor 83 which mechanically pivots the power lever 18 into various positions throughout its range of power settings. In series in cable 81, a limit switch L.S. shown normally closed at 139 and a manual switch MS, the bottom switch 137, is closed by the pushbutton to set the governor drive motor in automatic operation. These motor control circuit terminals 379, 381 appear as the output terminals of a B+ supplied, microprocessor controlled motor control circuit 150n to be considered substantially identical to the companion circuit 150m for the swash plate control.

The built-in protection and safeguards described for circuit 150m as it accurately controls the swash plate tilt angle afford the same benefits to the identical circuit 150n as it equally accurately controls the pivot angle of the power lever.

In practice, the microprocessor 140 will have high sensitivity in the power and speed modes and the proportionally moving swash plate actuator 26 will have correspondingly high responsiveness, i.e., in 0.3 seconds, the swash plate will travel from one extreme tilt angle to the opposite extreme compared to the relatively slow power lever motor 83 which may take 10 seconds to achieve full travel. The high responsiveness of the swash plate actuator 26 to change the transmission ratio compared to the slow response of the power lever control motor 83 establishes a priority in the manner in which the control apparatus as a whole adjusts to varying conditions of load and/or desired ground speed. Thus, when a sufficiently large deviation in ground speed from the desired value exists, the control apparatus will simultaneously adjust the transmission ratio, in the power limiting mode described above, as well as the power lever setting to reduce the deviation. Because of the relative response times, the transmission ratio adjustments will bear the brunt of this correction. When the deviation results in an increase of engine speed beyond the desired value, the speed mode of the transmission control will maintain a constant ground speed while the power lever control will correct engine speed deviation, both controls acting relatively independently.

Besides applying torque to the rest of the power train including the drive axles illustrated herein, the engine of the present power train separately but equally effectively drives the conventional single speed or dual speed power take-off (PTO) shaft of the tractor, not shown, at a speed proportional to engine speed. Although, the control module in its transmission modes does not directly affect the PTO output, the effect of the PTO and air conditioning and other parasitic loading about the tractor is included in the control module's operation. In other words, the various sensors of speed and other sensors hereof take into account all engine loading for engine optimization automatically with the sequential transmission ratio setting. However, a special PTO mode is provided for use with automatic power setting which is discussed in the aforementioned application Ser. No. 620,762.

The load on the farm tractor, from the auxiliaries just mentioned and on the drawbar, varies considerably with the nature of the work which includes, of course, merely towing a wagon or idle machinery. On a long downslope where the drawbar pull becomes negative and the tow and tractor develop a momentum motoring the tractor engine, the electrical circuit of the governor motor drive 83 and the electrical hydraulic circuit of the swash plate actuator 26, FIG. 1, automatically establish cooperation to offset excessive engine speeds, as exemplified below.

EXAMPLE IX

The effect of sustained rolling downgrade by the tow and tractor is to increase engine rpm and ground speed. Programmed to keep the ground speed constant in speed logic mode in the manner described, the automatic transmission control sets the ratio eventually for its maximum. The ultimate effect is that the tractor axles are forced to drive the engine through equivalent step-up gearing at an effective reduction ratio of 2.39:1. And by its desired complementary action, the automatic power control sets the engine throttle eventually to a low or no fuel rate. Engine braking affords positive vehicle control because the tractor axles in order to turn are forced to drive the persisting and practically dead load of the engine and must do so only through high ratio step-up gearing to that constant energy absorbing load.

EXAMPLE X

Drawbar pull can require in cases 50% to 80% of engine power in a farm tractor, as in pulling a disk harrow, or a much lower percentage in level towing. The automatic transmission control can, within the range of drawbar pull requirements herein contemplated, automatically establish minimum fuel consumption at infinitely adjustable speeds within the range of approximately 3 to 8 miles per hour (mph) ground speed or 4.8 km/hr. to 12.8 km/hr., all in the mid-range setting of the range transmission. The synergistic effect of the automatic power control when coupled therewith is to afford infinite speed adjustability within the larger ground speed range of approximately 1.5 to 8 mph (2.4 to 12.8 km/hr.). This effect, with a constant view to achieving least fuel consumption, is obviously separate in its view from the synergism apparent in preceding Example IX, which ensures positive vehicle control, automatically during sustained coasting, without the least regard to fuel consumption.

Assume that the driver is operating the tractor in mid-range under a moderate load which he sees is moderating more and more and increases the speed lever setting to take advantage. The upshift of the range transmission which is called for will be delayed by the speed transmission controls to the time at which the tractor under automatic control is operating well within the 6 to 8 mph speed at the top of mid-range which overlaps with the bottom of the high range. At that time, the microprocessor will have the speed transmission running at a very slight gear reduction ratio, close to the minimum 1:1.005 representing the absolute top speed achievable on the ground in the mid-range setting.

The condition is ideal for making the upshift, which the driver does, while allowing the automatic clutch control to adjust the speed transmission for the near maximum gear reduction, that is, close to 1:2.39 and thus synchronize the clutch input speed to the speed of the now slowly turning output side of the clutch. Release of the clutch pedal by the operator is, rather uniquely attended by no sensation whatever because the clutch is torque free upon reengagement and so cannot produce an acceleration shock or lurch to the tractor. Moreover, immediately upon reengagement, the microprocessor acting in both its power limiting and automatic power control modes immediately settles the engine back into optimum fuel performance and the tractor operation is resumed still within the 6 to 8 mph speed range, but now in high range. The downshift sequence from high range to mid-range can readily be deduced at this point and, similarly, the upshift and downshift sequence between the mid and low ranges and so they will not be detailed.

No constraint is placed on the driver as to when he makes a shift up or down and, in practice, there is sometimes no accounting for when a driver just may decide to upshift or downshift. The automatic clutch control hereof makes its effort always towards near synchronization, if not exact synchronization which occurs only during ranges overlap. During an ongoing planting operation, while in mid-range with the transmission set for automatic control at reduction ratio of 1:1.5, for example, the driver may notice something in the field demanding a prompt downshift to LO. In reaction to the completed downshift, the automatic clutch control immediately brings up the clutch input side all the way to engine speed (by setting least reduction ratio 1:1.005) for synchronization, as near as possible, with the downshifted, speeded up output side of the disengaged clutch. That is, when required to do so, the automatic transmission control instantly goes to the appropriate limit of the speed transmission range in setting the reduction ratio, thus in every case reducing the speed differential between the opposite sides of the clutch to whatever minimum is attainable.

In a further and quite commonly encountered example, the driver as a rule will use a range transmisison setting of LO to start-up of the tractor from strandstill. In contrast to the well known capability of a strict hydrostatic transmission to achieve a pure 0:1 reduction ratio preparatory to start-up, the hydromechanical transmission 20 under the automatic clutch control hereof affords at maximum no more than 1:2.39 ratio and hence, when so set, can run the clutch input side slowly at only a near match to the zero speed of the output side of the clutch existing at tractor standstill. Yet, the declutched sides will immediately, relatively speaking, reach the minimum speed differential between themselves that can be reached with the capability of the present illustrative speed transmission 20.

A further contrast found with the present transmission is worth noting in connection with speed of response of conventional synchronized shifters such as the shift sleeve 102 of the companion range transmission 28. In the manual completion of each shift, the affected synchronizer is manually actuated in known way to force the range transmission 28 internally into exact synchronism in the gear path concerned, and the results occur rapidly and hardly delay the shift at all because the transmission is freed of external rotational inertial loads, being connected at the driven side to the declutched output side of the clutch.

At the same time and for the same reason, the speed transmission 20 which is effecting power synchronization automatically is unburdened by external rotational inertia. But here, in comparison to the above rapidity of a mere mechanical response, the declutched input side reacts instantaneously to changes of swash plate angle and the speed of the clutch input side fairly well follows the output side as the latter respectively speeds up or slows. The automatic clutch control is much faster in pre-synchronizing or near-pre-synchronizing relative to the operator, than is the operator in normal reengagement with his foot following a hand shift. The operator still follows his normal shift practice without alteration, resting assured that this instantaneous clutch operation will have already become an accomplished fact.

In summing up, it will be appreciated that five principal signals to the microprocessor, as well as the clutch-engaged and out-of-neutral switches, determined, in conjunction with the microprocessor, the operation of the power train in all modes. The position of the power lever 18 is the first signal and determines, through a comparison with the power match curve 136, the desired engine speed to produce best fuel economy. The position of the speed lever 22 is the second signal and determines the desired clutch input speed, which, when operating, is proportional to ground speed. The third, fourth, and fifth signals are the various speed inputs, respectively the engine speed, the clutch input speed, and the clutch output speed.

The automatic transmission control, when the clutch is engaged, adjusts the transmission ratio in power limiting mode, to maintain engine speed at the desired speed rather than allowing it to fall under an increase in load, and in speed control mode, adjusts the transmission ratio to maintain clutch input and ground speeds at the desired value determined by speed lever 22 if the engine speed exceeds the desired engine speed.

Augmenting the transmission control, the automatic power lever control, with the clutch engaged, causes a slower adjustment of engine power if, in the power limiting mcde, the actual transmission ratio drops more than 2% below the desired command ratio based on the setting of speed lever 22, causing an increase. If, in the speed logic mode, the engine speed exceeds the desired engine speed by more than 50 rpm, the automatic power lever control will cause a decrease in the power lever setting.

In the automatic clutch control mode, which operates only when the clutch is not engaged and the range transmission is not in neutral, the microprocessor uses only the three speed input signals to adjust the speed transmission ratio to bring the actual ratio into equivalence with a reference ratio based on the clutch output speed and the engine speed and, in so doing, equalizes the clutch input speed and clutch output speeds.

In the automatic clutch control mode, the automatic power control system is not utilized in the preferred embodiment primarily because the slow response of the power lever control motor compared to the rapidity of shifting would render it of little use.

In an alternative embodiment, however, the response of the power level control could be made more instantaneous for clutch control operation and the automatic power control mode could then augment the transmission shifting operation similar to its augmentation of the operating transmission modes but being dependent in clutch control purely on the actual transmission ratio being greater or less than a deadband around the reference ratio.

It is evident the invention applies equally to engine-transmission power trains with other types of continuously variable transmissions (CVT's) including the lower horsepower, belt drive type, continuously variable mechanical transmissions if a clutch is incorporated downstream thereof. Also the present principles apply with equal force to further engine-CVT power trains, hydrostatic and hydromechanical and others. Although perhaps not ideal for maintaining the engine exactly on the least BSFC curve, the invention can also be applied to step change power shift transmissions. Indeed, given enough gears, a power shift transmission eventually approaches a continuously variable transmission.

What is claimed is:

1. Drive train equipped for power control thereover:
    said train comprising a variable speed engine with variable ratio reduction gearing and, therefollowing, a fixed, step change transmission with a detectible neutral setting, and having means coupling them in that order;
    said coupling means comprising a mid-mounted clutch having opposite friction engaging portions consisting of an engine-connected clutch side connected to the engine and its reduction gearing and an stepchange-connected clutch side connected to the step change transmission, said variable engine and variable reduction gearing having an electrical control for at least one of the two to vary operation of same for setting speed on the engine-connected side of the clutch;
    means for generating a first signal with frequency proportional to the clutch rotational speed on its engine connected side;

means for generating a second signal with frequency proportional to the clutch rotational speed on its step change connected side;

signal comparison means connected to the engine-reducing gearing electrical control effective in response to detecting transmission setting other than neutral to bring into equivalence the respective frequency and speed of the first and second signals and the clutch as both sides;

said step change transmission having a plurality of fixed, specific reduction ratios providing corresponding speed ranges;

a variable range transmission providing a continuously variable range of speed reduction ratios, said variable range transmission being equipped with transmission pump and motor hydraulic units with variable displacement to vary their speed ratio, and electrically controlled hydraulic means to vary such displacement and correspondingly vary the variable transmission output speed and torque, said variable transmission including manual means for varying the variable transmission output speed and torque;

a command signal generator for connection to the electrical hydraulic means to provide thereto a main command signal for setting desired output speed of the variable transmission by varying the pump-and-motor speed-ratio of same as it is driven under engine power;

means for storing in a memory a predetermined consecutive series of desired engine speed values which result in substantially minimum brake specific fuel consumption for a range of engine power setting;

first means connected to the memory for generating a reference command indicative of that particular engine speed value which is desired corresponding to the actual engine power setting; and second means for generating a second signal indicative of the actual engine speed;

third means for generating a third signal indicative of the setting of the manual means for varying the variable transmission output speed and torque;

said first and second and third means having means connected to the signal generator for modifying the main command signal automatically, in response to a deficiency of one of said reference command and second signal compared to the other.

* * * * *